United States Patent [19]
Nee

[11] Patent Number: 5,312,137
[45] Date of Patent: May 17, 1994

[54] SAFETY SHIELD

[75] Inventor: Gerard J. Nee, West Caldwell, N.J.

[73] Assignee: Ramco Manufacturing Company, Inc., Roselle Park, N.J.

[21] Appl. No.: 778,341

[22] Filed: Oct. 16, 1991

Related U.S. Application Data

[63] Continuation-in-part of Ser. No. 500,064, Mar. 27, 1990, abandoned.

[51] Int. Cl.⁵ .................................... F16L 55/168
[52] U.S. Cl. ................................ 285/14; 285/15; 285/93; 285/423; 285/45
[58] Field of Search ............ 265/15, 45, 93, 41, 265/13, 14, 373, 423; 138/99

[56] References Cited

U.S. PATENT DOCUMENTS

| | | | |
|---|---|---|---|
| 333,413 | 12/1885 | Hoeveler | 285/13 |
| 903,316 | 11/1908 | Reimann | 285/14 |
| 1,940,729 | 12/1933 | Pfefferle | 285/13 X |
| 2,699,960 | 1/1955 | Callery et al. | 285/93 X |
| 3,280,846 | 10/1966 | Anderson et al. | 138/99 |
| 3,516,688 | 6/1970 | Gachot | 285/93 X |
| 3,944,260 | 3/1976 | Petroczky | 285/15 |
| 3,954,288 | 5/1976 | Smith | 285/93 |
| 4,870,856 | 10/1989 | Sharp | 285/93 X |
| 5,064,223 | 11/1991 | Gross | 285/93 |

FOREIGN PATENT DOCUMENTS 2111624  7/1983  United Kingdom ............ 285/45

*Primary Examiner*—Dave W. Arola
*Attorney, Agent, or Firm*—Lerner, David, Littenberg, Krumholz & Mentlik

[57] ABSTRACT

A safety shield for capturing corrosive fluids escaping from a joint formed in a piping system consists of first and second shroud members releasably joined to form an enclosed chamber in assembled position about the pipe joint. The chamber includes at least one aperture which is sized and shaped to form a vapor-tight seal around the pipe. Preferably, the safety shield includes an outlet for discharging any fluid which may accumulate in the chamber. Optionally, devices may be attached in communication with the interior of the chamber for determining the physical conditions therein.

8 Claims, 6 Drawing Sheets

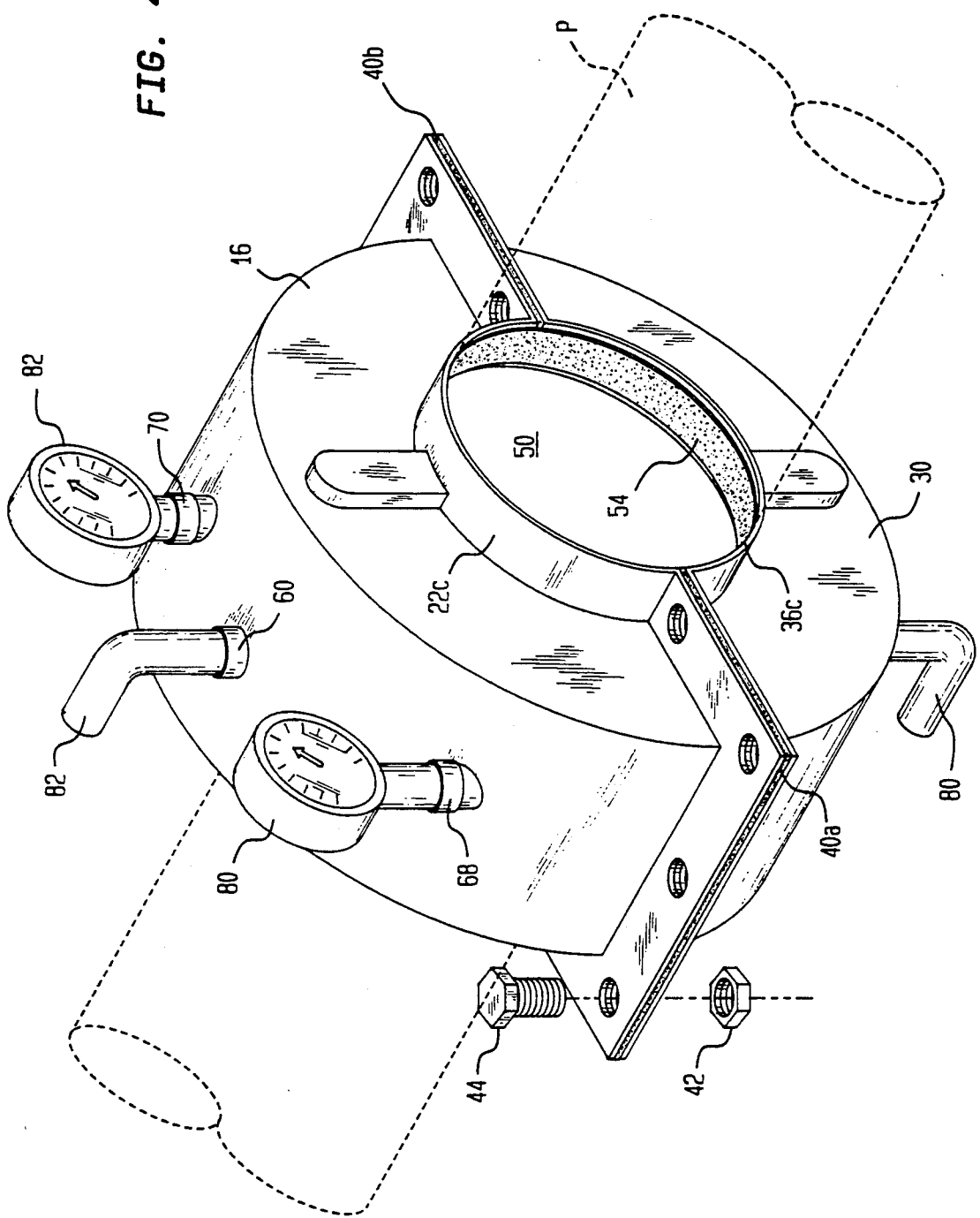

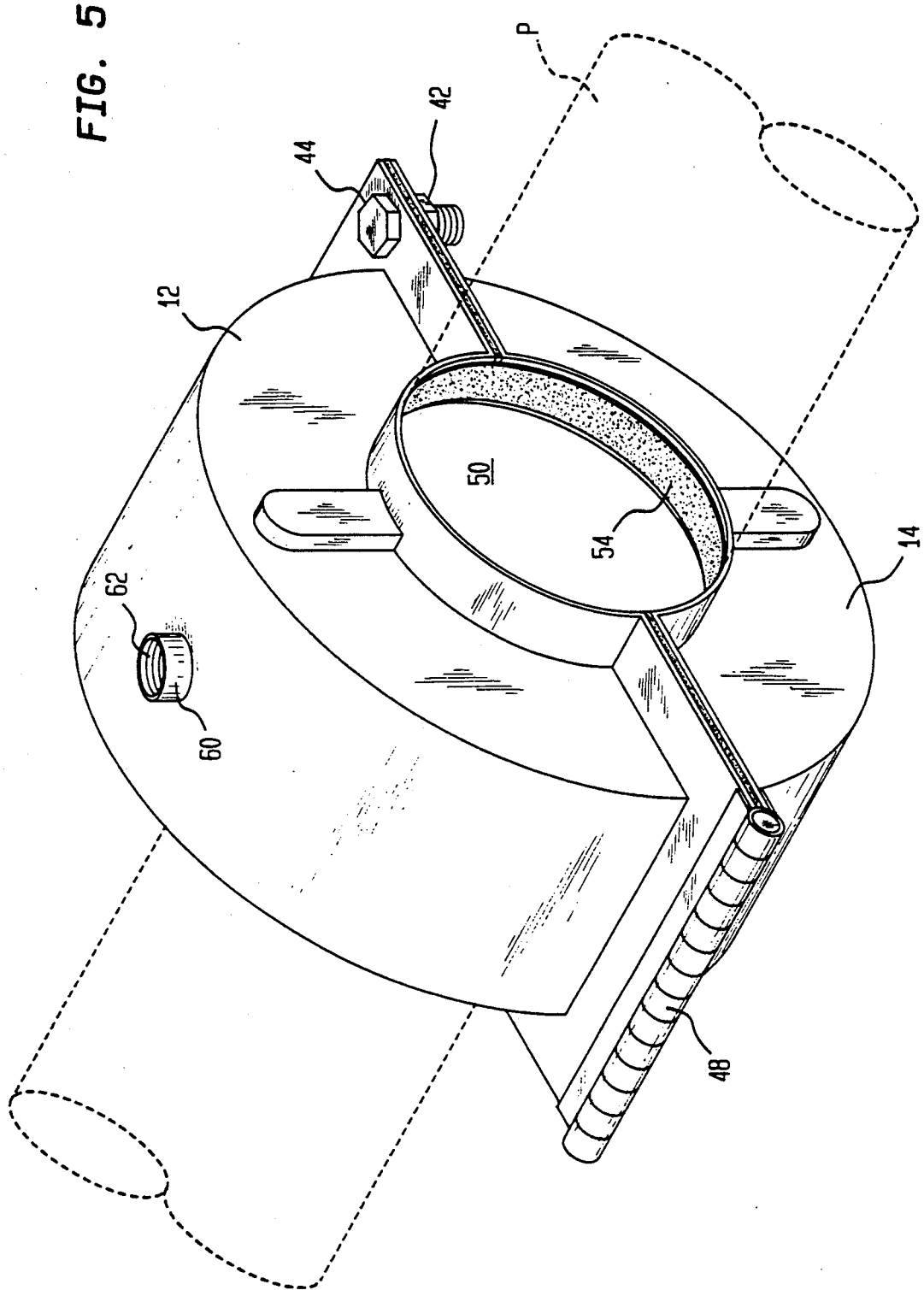

SAFETY SHIELD

CROSS-REFERENCE TO RELATED APPLICATIONS

This is a continuation-in-part of application Ser. No. 07/500,064 filed Mar. 27, 1990 and now abandoned.

FIELD OF THE INVENTION

The present invention relates to a safety shield for intercepting leakage from pipe joints. More particularly, the present invention relates to a safety shield which intercepts and contains both liquids and vapors which leak from a pipe joint.

BACKGROUND OF THE INVENTION

Many factories, such as chemical manufacturing plants and the like, have extensive systems of piping which handle corrosive or otherwise hazardous fluids. These fluids typically consist of liquids, vapors or combinations thereof which travel through the pipes under varying pressures.

In view of the hazardous nature of these fluids, the integrity of the piping systems is critical. Notwithstanding the care exhibited in assembling and maintaining these systems, leaks occasionally develop, typically in joints between two or more pipes or between pipes and other components such as flanges, couplings, valves, expansion joints, gauges and the like. In most cases it is imperative that all of the liquid or vapor which may escape through these leaks be intercepted and contained before causing damage to equipment or, more importantly, to plant employees. This need is especially critical in those cases where the piping systems are carrying toxic materials, the escape of which would present an immediate danger to the health and even the lives of plant employees.

In addition, federal and state environmental regulations, for example, the federal Clean Air Act, as well as individual corporate air quality programs, seek to control and eliminate, or at least minimize the release of harmful materials into the environment. Such releases typically occur as standard process emissions or accidental emissions from process equipment. Many of the harmful materials these programs seek to control are cancer causing agents. Others, vapor emissions in particular, are harmful to the earth's ozone layer. Both the federal Environmental Protection Agency and the Occupational Safety and Health Administration have as their objectives the promotion and regulation of practices which minimize uncontrolled vapor and liquid releases by setting program guidelines for monitoring, detecting and containing such releases.

Presently available shields do not provide adequate safeguards to control such undesirable releases. Thus, while flexible safety shields, such as those disclosed in U.S. Pat. No. 4,106,428 to Matthiessen and co-pending application Ser. No. 07/445,176, intercept a stream of liquid which may leak from a pipe joint, they do not prevent the liquid from eventually dripping or otherwise flowing from the shield. Moreover, these flexible safety shields do not contain vapors which may escape through the pipe joint.

Other available safety shields consist of separable portions formed from a semi-rigid material which assemble around a pipe joint to form an annular chamber thereabout. The members are typically assembled by snapping the two portions together to form a loose fit about the pipe joint. Thus, since this type of shield does not adequately seal around the pipe it is unable to contain any escaping vapors and only minimally contains escaping liquids. Furthermore, the failure of the individual components to be positively and securely assembled together presents a hazardous condition. Should a significant amount of liquid accumulate in the shield, the shield may readily come apart, exposing those persons nearby to its contents. Even in those cases when the shield does not come apart under the weight of its contents, the need to remove the shield from the pipe joint in order to empty its contents exposes maintenance workers to potential harm.

Thus, the need exists for an improved safety shield capable of forming an airtight seal about a pipe joint in order to intercept and contain any liquid or vapor which may leak from the pipe joint. There also exists a need for a safety shield which will surround a pipe joint in a secure fashion and not readily become disengaged therefrom. Preferably, The improved safety shield will provide adequate safeguards from the release of harmful liquids and vapors in full compliance with governmental regulations. More preferably, the improved safety shield will enable any contained fluids to be readily drained therefrom without subjecting plant employees to their hazardous contents.

SUMMARY OF THE INVENTION

In accordance with the present invention, these needs have now been addressed by the invention of an improved safety shield for a joint in a pipe carrying a fluid. The safety shield consists of first and second shroud members joined to form a vapor-tight enclosed chamber in assembled position about the pipe joint; connecting means for releasably joining the first and second shroud members together; and at least one aperture in the chamber sized and shaped to form a vapor-tight seal around the pipe. The first and second shroud members are preferably formed from a corrosion resistant material, and more preferably from a mixture of fiberglass and an organic polymer. The fiberglass preferably comprises between about 10 wt. % and about 50 wt. % of the mixture; more preferably between about 20 wt. % and about 40 wt. % of the mixture; and most preferably about 30 wt. % of the mixture. Corrosion resistant gasket means are desirably included between the shroud members to assure the enclosure is adequately sealed.

In one embodiment, reinforcing ribs are disposed on at least one surface of the shroud members. Preferably, the reinforcing ribs are disposed on an interior surface of the shroud members defining the enclosed chamber. In a highly preferred embodiment, the chamber includes a pair of spaced wall members and an annular surface joining the spaced wall members, and the reinforcing ribs are disposed on the spaced wall members and the annular surface.

Preferably, the safety shield further includes outlet means for discharging any fluid accumulated in the chamber. In those cases where a liquid and a vapor may accumulate in the chamber, the outlet means desirably includes a first discharge port for discharging the liquid from the chamber, and a second discharge port for discharging the vapor from the chamber.

In highly preferred embodiments of the present invention, the safety shield further includes devices for determining the physical conditions within the enclosure. Desirably, the devices for determining the physical conditions within the enclosure include pressure sensing means, fluid sensing means wherein the fluid is a liquid and/or a vapor, temperature sensing means, and the like. Most desirably, the safety shield in accordance with this embodiment will further include alarm means responsive to signals generated by these devices.

Preferred embodiments of the present invention provide an improved safety shield wherein dangerous liquids and vapors which may leak from a joint in a piping system may be safely intercepted and contained. The safety shield is attached around a pipe joint in a secure fashion which will not be readily dislodged. Such safety shield not only satisfies the requirements of corporate safety programs, but prevents the undesirable release of harmful materials into the atmosphere and thereby facilitates full compliance with federal and state environmental regulations.

Furthermore, preferred embodiments of the present invention provide an improved safety shield which permits such contained liquids and vapors to be safely drained therefrom, thereby preventing the exposure of maintenance workers to such hazardous materials. In addition, the reinforced structure of the safety shield permits the attachment of various sensing and alarm devices which enhance the safety associated with using such shields.

Moreover, the preferred safety shield according to the present invention provides these improvements while at the same time being highly resistant to attack by the chemicals carried in the pipeline.

BRIEF DESCRIPTION OF THE DRAWINGS

A more complete appreciation of the subject matter of the present invention and the various advantages thereof can be realized by reference to the following detailed description, in which reference is made to the accompanying drawings in which:

FIG. 4 is a perspective view showing the safety shield of FIG. 1, with gauges and drain means attached thereto, in assembly about a pipe joint by means of nuts and bolts;

FIG. 5 is a perspective view showing the safety shield of FIG. 1, in hinged assembly about a pipe joint;

DESCRIPTION OF THE PREFERRED EMBODIMENT

Figure 1:
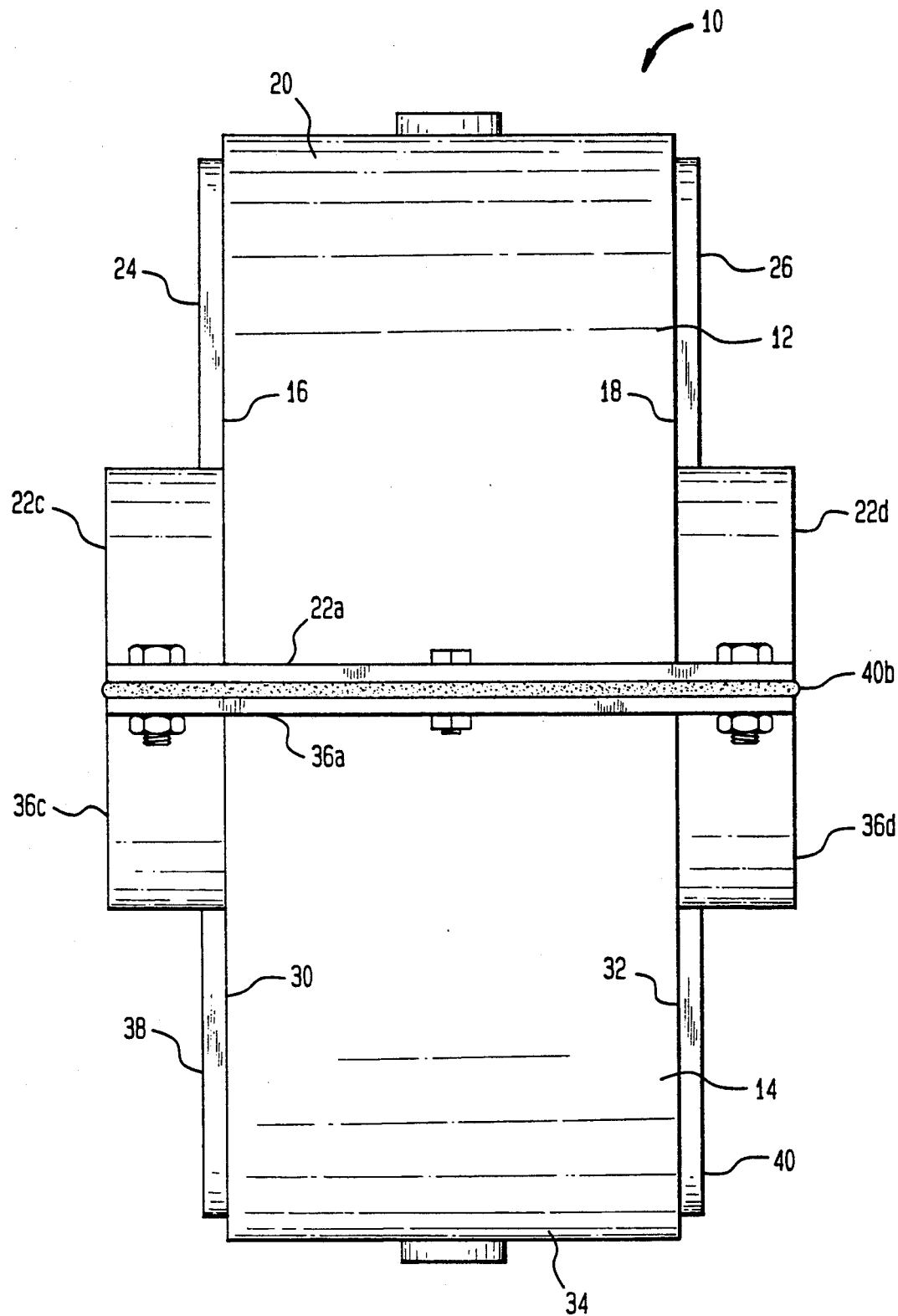
FIG. 1 is a front elevational view of an improved safety shield for a pipe coupling in accordance with one embodiment of the present invention.
Figure 3:
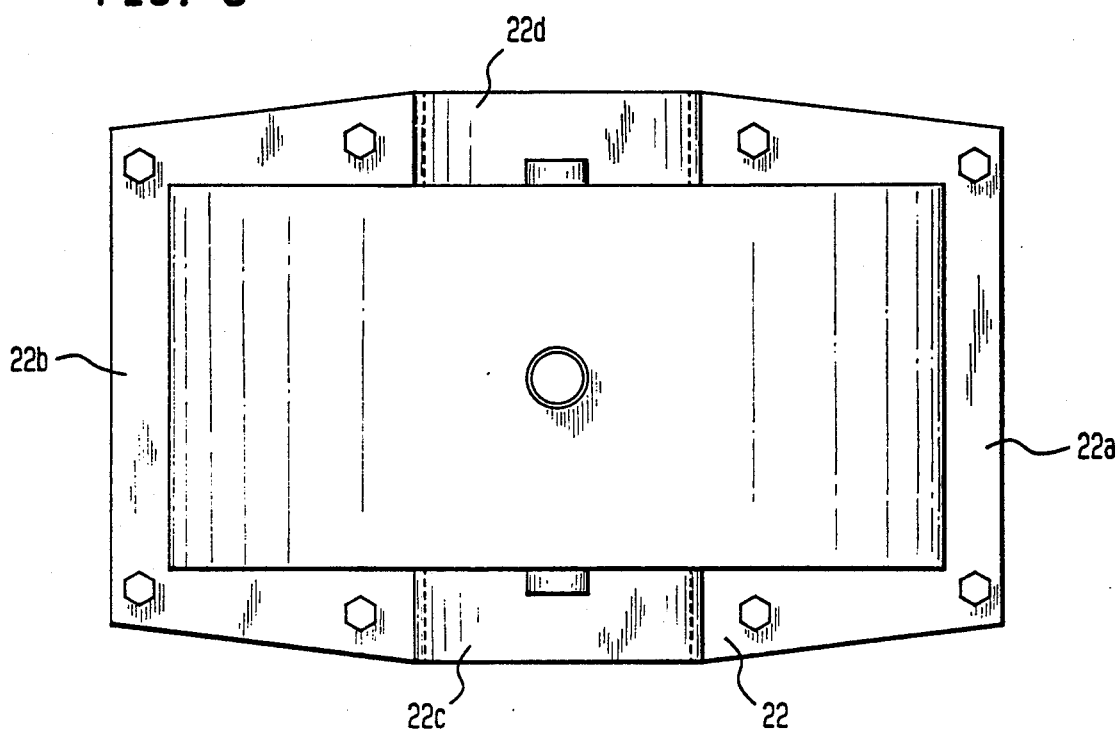
FIG. 3 is a top plan view of the safety shield of FIG. 1.
Figure 2:
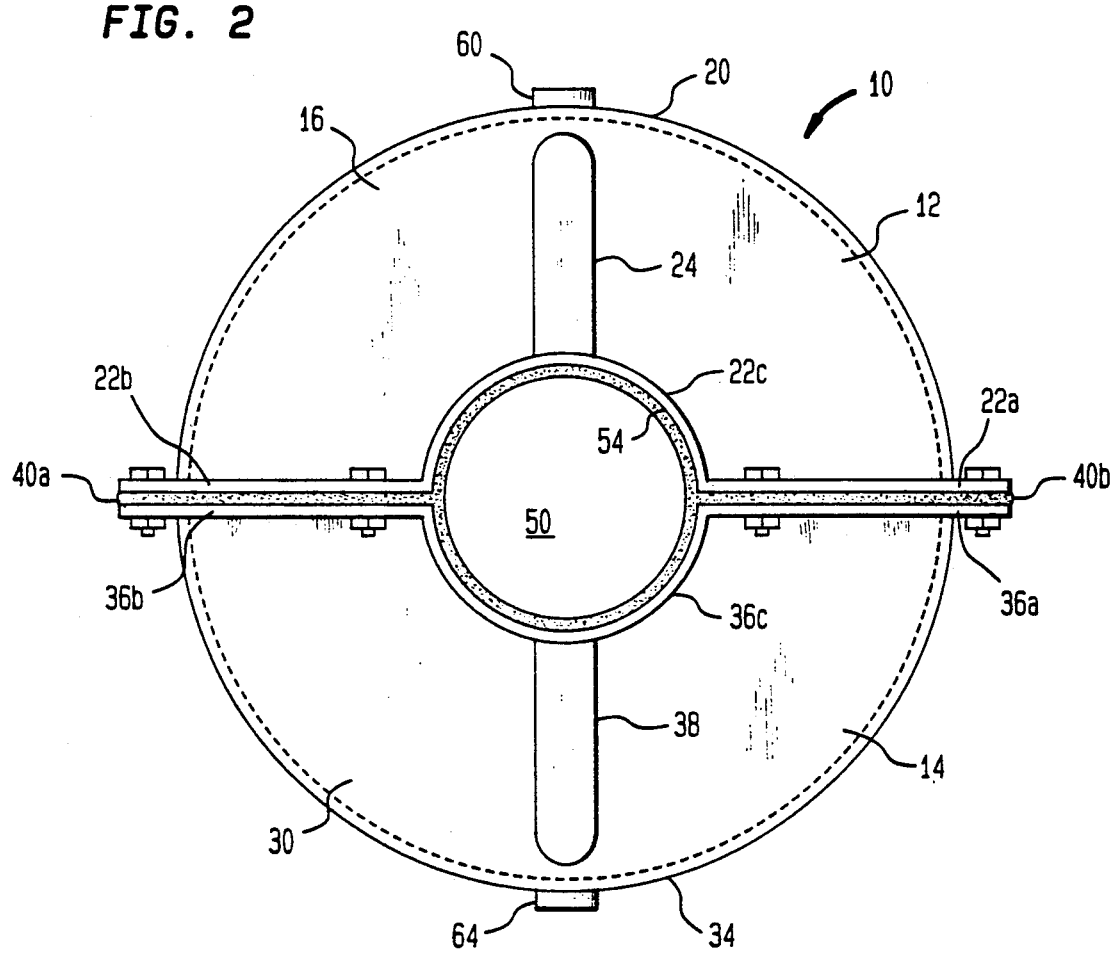
FIG. 2 is a side elevational view of the safety shield of FIG. 1.

For the purpose of describing the features of the present invention, the improved safety shield is discussed in association with a well-known type of flange pipe coupling typically found in chemical and similar industries which handle corrosive or otherwise hazardous fluids. As used herein, the term "fluid" refers to materials in any physical state which are capable of flowing through piping systems. Generally, the fluid materials referred to herein are liquids and/or vapors.

Such couplings generally include flanged sections having faces lying in planes normal to the longitudinal axis of the pipe. In a typical assembly, a gasket is inserted between the faces of the flanged sections which are then fastened together by bolts to form a liquid-tight joint. Although described in association with flanged pipe couplings, it is contemplated that the improved safety shield of the present invention may be assembled about any joint which may be formed in a piping system. As used herein, the hazardous fluids. As used herein, the term "fluid" term "pipe joint" refers to the seam formed by the assembly of individual components of the piping system. Such joints include, but are not limited to, the connection between segments of pipe, valves, gauges, expansion joints, meters, couplings and the like.

Fluids flowing through piping systems frequently encounter or create weak spots at pipe joints, particularly when they travel under high pressure. Such weak spots typically result from the deterioration of or defects in the gaskets assembled in the joint. When encountered, such weak spots may permit hazardous liquids and vapors to escape from the piping system. These liquids and vapors present a substantial danger not only to the equipment and personnel in close proximity to the pipe joint, but to the environment as well. In those cases where the leaking substance is toxic the dangers are magnified.

Accordingly, the present invention provides an improved safety shield to intercept and contain any fluids, particularly liquids and vapors, which may escape from a failed pipe joint, thereby protecting persons and objects in the vicinity of such a leaking pipe joint from possible serious injury, and protecting the environment from further endangerment.

Referring to the Figures, safety shield 10 has a generally annular shape formed by the assembly of shield members 12 and 14. Typically, shield members 12 and 14 are formed from a rigid or semi-rigid impervious material which is highly resistant to chemical attack. In some situations it is desirable to form shield members 12 and 14 from a flexible material such as polyethylene, polytetrafluoroethylene and the like in order to accommodate the expansion or other relative displacement of the piping system components. In other situations, safety shield 10 may encounter relatively high pressures caused in particular by vapors leaking from the pipe joint. In these situations, it is preferable to form shield members 12 and 14 from a more rigid material which will not deform under these high pressures and which will therefore be less susceptible to leakage. Preferred materials in this regard include polypropylene, stainless steel and other chemically resistant materials. More preferably, shield members 12 and 14 are formed from a chemically resistant organic polymer base material, such as polypropylene, polyethylene or polytetrafluoroethylene, to which fiberglass has been added as a reinforcing agent. Preferably, the fiberglass additions comprise between about 10 wt. % and about 50 wt. % of the entire composition; more preferably between about 20 wt. % and about 40 wt. % of the composition; and still more preferably about 30 wt. % of the composition. The addition of the fiberglass reinforcement has a negligible affect on the chemical resistance of the safety shield. As a result, these materials provide a safety shield which is lightweight and which is capable of withstanding pressures of about 200 psi or greater.

Shield member 12 has spaced semi-annular walls 16 and 18 joined together by a circumferential portion 20. Along an edge corresponding to the diameter of safety shield 10, shield member 12 includes a flange 22. One portion of flange 22 includes generally flat sections 22a and 22b which lie generally in a plane running through the longitudinal axis of safety shield 10. Another portion of flange 22 includes section 22c on wall 16 and section 22d on wall 18, each of which forms a semicircular path a spaced distance from the longitudinal axis of safety shield 10. Each of flange sections 22a–d may include a recessed groove 23 for receiving a sealing member, as will be described more fully below.

Figure 7:
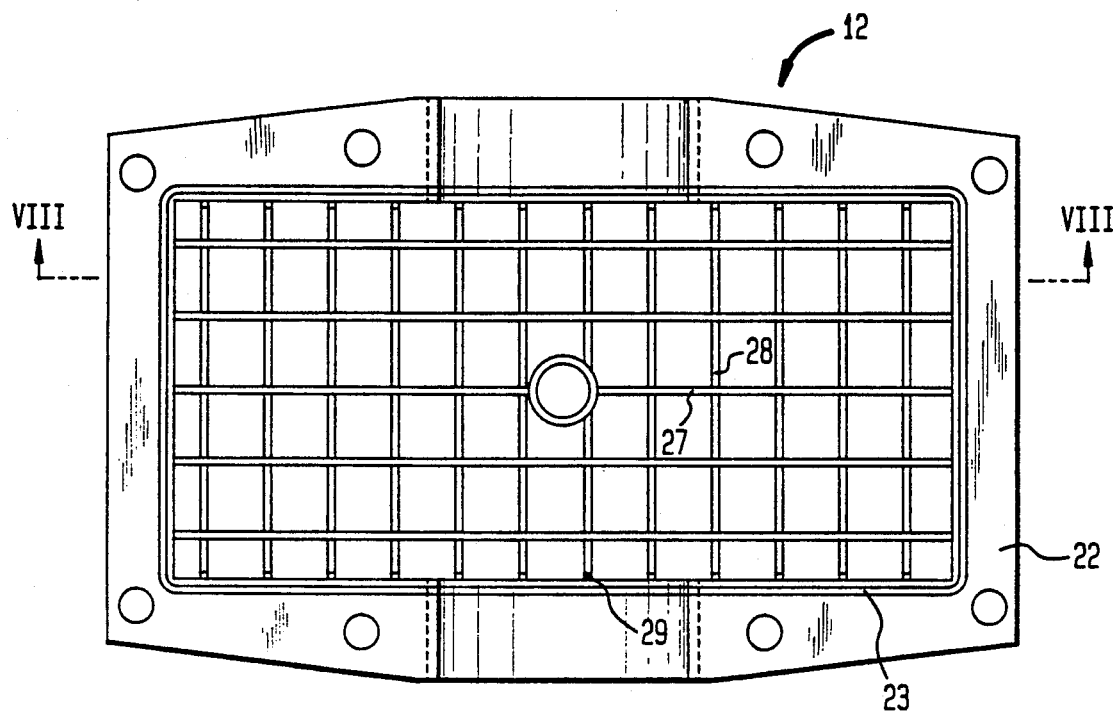
FIG. 7 is a bottom plan view of one shield member in accordance with another embodiment of the present invention.
Figure 8:
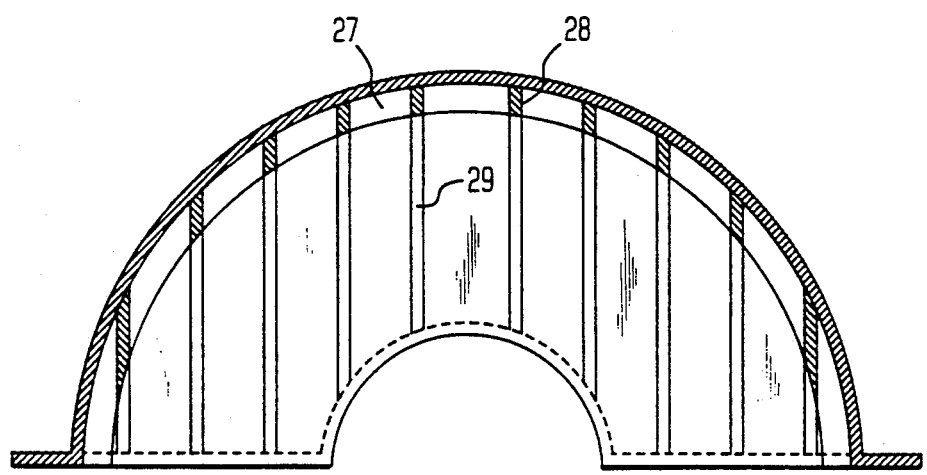
FIG. 8 is a sectional view taken along line VIII—VIII of FIG. 7.

In order to provide safety shield 10 with increased structural rigidity and increased resistance to distortion under high internal pressures, shield member 12 may optionally be provided with reinforcing structures. In one embodiment, annular wall members 16 and 18 may be provided with external reinforcing members 24 and 26 which lie in similar radial directions extending from flange portions 22c and 22d, respectively, towards circumferential member 20. In another embodiment, shown in FIGS. 7 and 8, shield member 12 may include reinforcing ribs formed on the interior surface thereof. Such ribs may be provided in place of or in addition to reinforcing members 24 and 26. In a highly preferred arrangement, the inside surface of circumferential portion 20 includes both longitudinal ribs 27 and transverse ribs 28, while the inside surface of walls 16 and 18 include only transverse ribs 29. Forming ribs 27, 28 and 29 with a thickness of about 1/16 inch and a depth of about ¼ inch provides sufficient structural strength without interfering with the fit of safety shield 10 around a pipe flange or other such joint.

Shield member 14 may be structurally identical to shield member 12. Thus, shield member 14 has spaced semi-annular walls 30 and 32 joined together by a circumferential portion 34. A flange 36 is disposed along an edge of shield member 14 corresponding to the diameter of safety shield 10. One portion of flange 36 includes generally flat sections 36a and 36b which lie generally in a plane running through the longitudinal axis of safety shield 10. Another portion of flange 36 includes section 36c on wall 30 and section 36d on wall 32, each of which forms a semicircular path a spaced distance from the longitudinal axis of safety shield 10. Although not shown, flange sections 36a–d may also include a recessed groove for receiving a sealing member, similar to the groove 23 formed in shield member 12. Again, shield member 14 may be formed with reinforcing structures for increasing the structural rigidity thereof. In one embodiment, reinforcing members 38 and 40 are disposed on annular wall members 30 and 32 in similar radial directions extending from respective flange portions 36c and 36d towards circumferential member 20. Alternatively, or in addition, the internal surfaces of shield member 14 may be formed with reinforcing ribs (not shown), such as those described above in connection with shield member 12.

Safety shield 10 is assembled about a flanged pipe coupling in order to provide a liquid- and vapor-tight enclosure thereabout. Thus, as shown in FIG. 4, generally flat gasket portion 40a is sandwiched between flange sections 22a and 36a on one half of safety shield 10, and flat gasket portion 40b is sandwiched between flange sections 22b and 36b on the other half of safety shield 10 to seal the interface between shield members 12 and 14. Where the flange sections 22a, 22b, 36a and 36b are formed with a recessed groove, such as groove 23, a gasket having a round or similar cross-section, such as an O-ring gasket, may be inserted in the groove to provide an improved seal between shield members 12 and 14. The individual components are securely held in assembled position by any suitable means. In the embodiment shown in FIG. 4, a plurality of nuts 42 and bolts 44 engage a series of aligned apertures 46 in flange sections 22a, 22b, 36a and 36b, and in gasket portions 40a and 40b to hold the assembly together.

Figure 6:
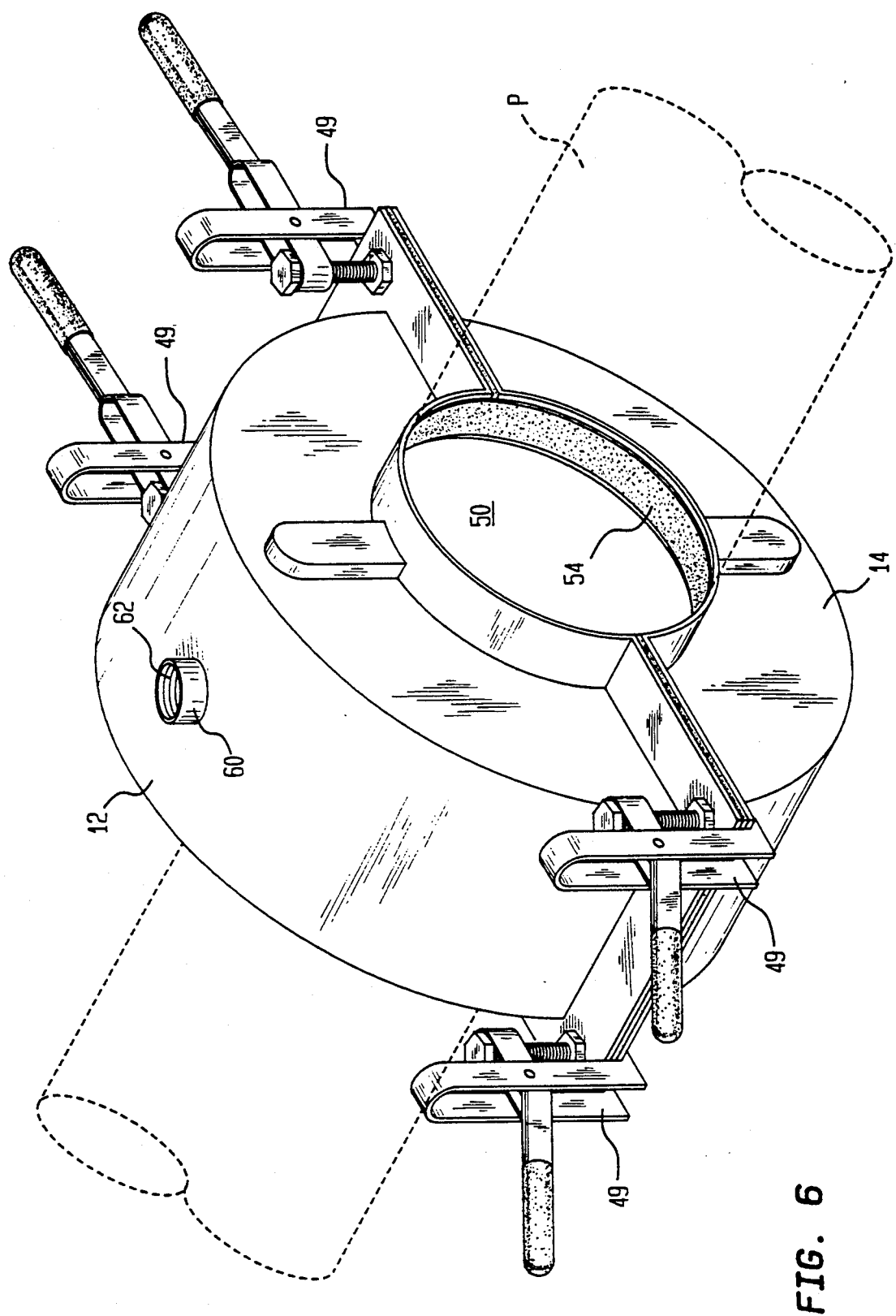
FIG. 6 is a perspective view showing the safety shield of FIG. 1 assembled about a pipe joint by means of clamps.

Other suitable means for holding shield members 12 and 14 securely together about a pipe joint while permitting their subsequent disassembly therefrom are also contemplated. Thus, as shown in FIG. 5, shield members 12 and 14 may be connected along one edge by hinge member 48 and bolted or clamped together along the opposite edge, such as by nuts 42 and bolts 44. Alternatively, flange sections 22a, 22b, 36a and 36b may include a series of clamps 49, such as those shown in FIG. 6, which will hold shield members 12 and 14 securely together while permitting these members to be quickly disassembled. The particular structure of clamps 49 necessary to firmly hold the flat flange sections of shield members 12 and 14 together would be readily apparent to one of ordinary skill in the art and do not constitute a part of the present invention.

In assembled position, shield members 12 and 14 define aperture 50, the circumference of which is coextensive with flange sections 22c and 36c, and aperture 52, the circumference of which is coextensive with flange sections 22d and 36d. Apertures 50 and 52 are sized to snugly engage the portions of pipe P on either side of the flanged pipe coupling. Thus, when used for pipes P having a large diameter, safety shield 10 has correspondingly large apertures 50 and 52; when pipes P have a small diameter, apertures 50 and 52 are correspondingly small. In order to assure a liquid- and vapor-tight seal about pipe P, aperture 50 preferably includes gasket member 54. Aperture 52 includes a similar gasket member 56, not shown. Typically, gasket members 54 and 56 will be formed with a flat cross-section. However, where flange sections 22c, 22d, 36c and 36d are formed with a recessed groove, gasket members 54 and 56 will desirably have a round or similar cross-section. Preferably, gasket members 40a, 40b, 54 and 56 are formed from a material which is sufficiently chemically resistant to withstand attack from the corrosive liquids and/or vapors which are retained by safety shield 10, but which is sufficiently pliable to form a liquid- and vapor-tight seal when safety shield 10 is in assembled position about pipe P. An example of one such material is polytetrafluoroethylene.

It is also contemplated by the present invention that safety shield 10 may be formed with a pair of apertures which are not in axial alignment. Thus, should it be desirable to assemble a safety shield about an elbow coupling or other device which angularly displaces the portions of pipe with respect to one another, apertures 50 and 52 may be formed with a corresponding angular displacement for sealing engagement thereabout. Similarly, the present invention contemplates forming safety shield 10 with a single aperture 50 for assembly about a joint at an unattached end of pipe.

As shown in the Figures, shield member 12 may include a boss member 60 having a threaded aperture 62 in communication with the interior of safety shield 10.

In like manner, shield member 14 may include boss member 64 having a threaded aperture 66, not shown, communicating with the interior of safety shield 10. When provided in shield members 12 and 14, threaded apertures 62 and 66 provide a means for forming leak-proof connections with safety shield 10.

One useful purpose for such leak-proof connections with safety shield 10 is to enable any liquid and/or vapor retained in the interior of safety shield 10 to be removed therefrom without the need for disassembling safety shield 10 from about the flanged pipe coupling. Thus, as shown in FIG. 4, a conduit 80 may be threadedly engaged with aperture 66 at or near the bottom of safety shield 10 in order to provide a means for safely draining any liquid which may be contained by or accumulated within safety shield 10. Similarly, conduit 82 may threadedly engage aperture 62 at or near the top of safety shield 10 in order to safely evacuate any toxic or otherwise harmful vapors which may be contained by or accumulate in safety shield 10. Conduits 80 and 82 may direct the leaked fluid from safety shield 10 back into pipe P or to other locations as desired.

In certain situations it may be desirable to monitor the conditions in the interior of safety shield 10. In those situations, additional boss members such as 68 and 70 having associated threaded apertures may be included to provide a useful means which enable various gauges or other components to access the interior of safety shield 10 in a leak-proof manner. FIG. 4 shows two such gauges 80 and 82 fixedly attached to shield member 12 for communication with the interior of safety shield 10. Gauges 80 and 82 may consist of pressure gauges for measuring the pressure within safety shield 10, temperature gauges for measuring the temperature within safety shield 10, vacuum gauges for testing the integrity of the seal formed by safety shield 10, and the like. Additionally, instead of or in addition to gauges 80 and 82, shield member 10 may have attached thereto various other components, such as level switches, flow switches, liquid and/or gas detectors, alarm systems, valves, or any other component which may be desirable for insuring the safety and operability of safety shield 10. Any number of threaded apertures communicating with the interior of the safety shield 10 may be employed, provided that the strength and integrity of the safety shield is not compromised thereby.

Although the invention herein has been described with reference to particular embodiments, it is to be understood that these embodiments are merely illustrative of the principals and applications of the present invention. It is therefore to be understood that numerous modifications may be made to the illustrative embodiments and that other arrangements may be devised without departing from the spirit and scope of the present invention as set forth in the appended claims.

I claim:

1. A safety shield for capturing a corrosive fluid escaping from a joint in a pipe, comprising
   first and second shroud members formed from a corrosion resistant material,
   connecting means for releasably joining said first and second shroud members together along a joining region to form an enclosed chamber in assembled position about said pipe joint,
   corrosion resistant gasket means arranged between said first and second shroud members to render said joining region vapor tight in said assembled position,
   at least one aperture in said enclosed chamber sized and shaped for mating engagement around said pipe,
   corrosion resistant sealing means for forming a vapor-tight seal between said pipe and said at least one aperture, said corrosion resistant sealing means and said corrosion resistant gasket means coacting to render said enclosed chamber vapor tight in said assembled position, and
   outlet means for discharging any said fluid accumulated in said chamber, wherein said corrosive fluid includes a liquid and a vapor, and said outlet means includes a first discharge port for discharging said liquid from said chamber, and a second discharge port for discharging said vapor from said chamber.

2. A safety shield for capturing a corrosive fluid escaping from a joint in a pipe, comprising
   first and second shroud members formed from a corrosion resistant material,
   connecting means for releasably joining said first and second shroud members together along a joining region to form an enclosed chamber in assembled position about said pipe joint,
   corrosion resistant gasket means arranged between said first and second shroud members to render said joining region vapor tight in said assembled position,
   at least one aperture in said enclosed chamber sized and shaped for mating engagement around said pipe,
   corrosion resistant sealing means for forming a vapor-tight seal between said pipe and said at least one aperture, said corrosion resistant sealing means and said corrosion resistant gasket means coacting to render said enclosed chamber vapor tight in said assembled position, and
   reinforcing ribs disposed on at least one surface of said shroud members.

3. A safety shield as claimed in claim 2, wherein said reinforcing ribs are disposed on an interior surface of said chamber.

4. A safety shield as claimed in claim 3 wherein said chamber includes a pair of spaced wall members and an annular surface joining said spaced wall members, and said reinforcing ribs are disposed on said spaced wall members and said annular surface.

5. A safety shield for capturing a corrosive fluid escaping from a joint in a pipe, comprising
   first and second shroud members formed from a corrosion resistant material, said corrosion resistant material consisting of a mixture of fiberglass and an organic polymer,
   connecting means for releasably joining said first and second shroud members together along a joining region to form an enclosed chamber in assembled position about said pipe joint,
   corrosion resistant gasket means arranged between said first and second shroud members to render said joining region vapor tight in said assembled position,
   at least one aperture in said enclosed chamber sized and shaped for mating engagement around said pipe, and
   corrosion resistant sealing means for forming a vapor-tight seal between said pipe and said at least one aperture, said corrosion resistant sealing means and said corrosion resistant gasket means coacting to render said enclosed chamber vapor tight in said assembled position.

6. A safety shield as claimed in claim 5 wherein said fiberglass comprises between about 10 wt. % and about 50 wt. % of said mixture.

7. A safety shield as claimed in claim 6 wherein said fiberglass comprises between about 20 wt. % and about 40 wt. % of said mixture.

8. A safety shield as claimed in claim 7 wherein said fiberglass comprises about 30 wt. % of said mixture.

* * * * *